UNITED STATES PATENT OFFICE.

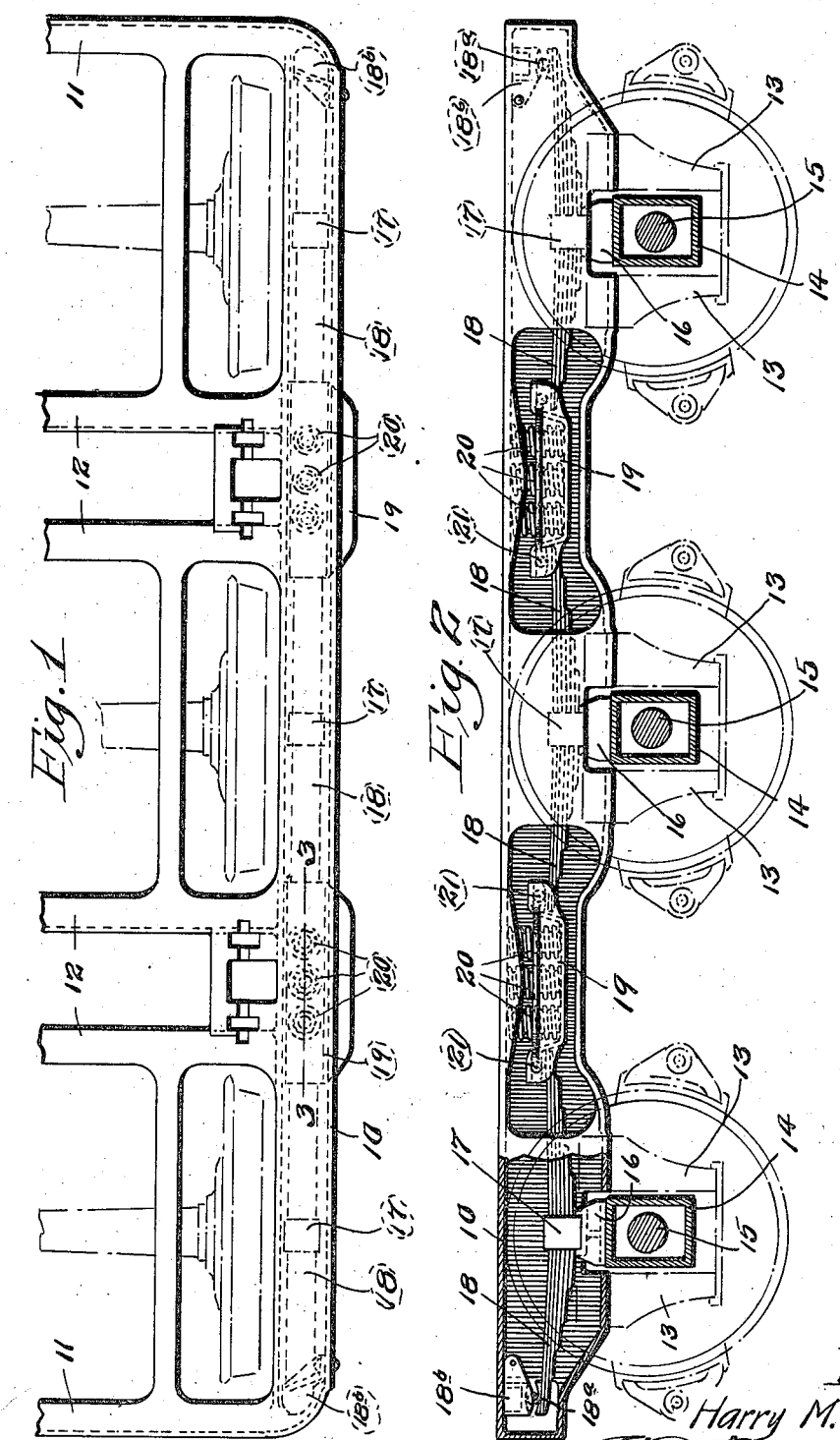

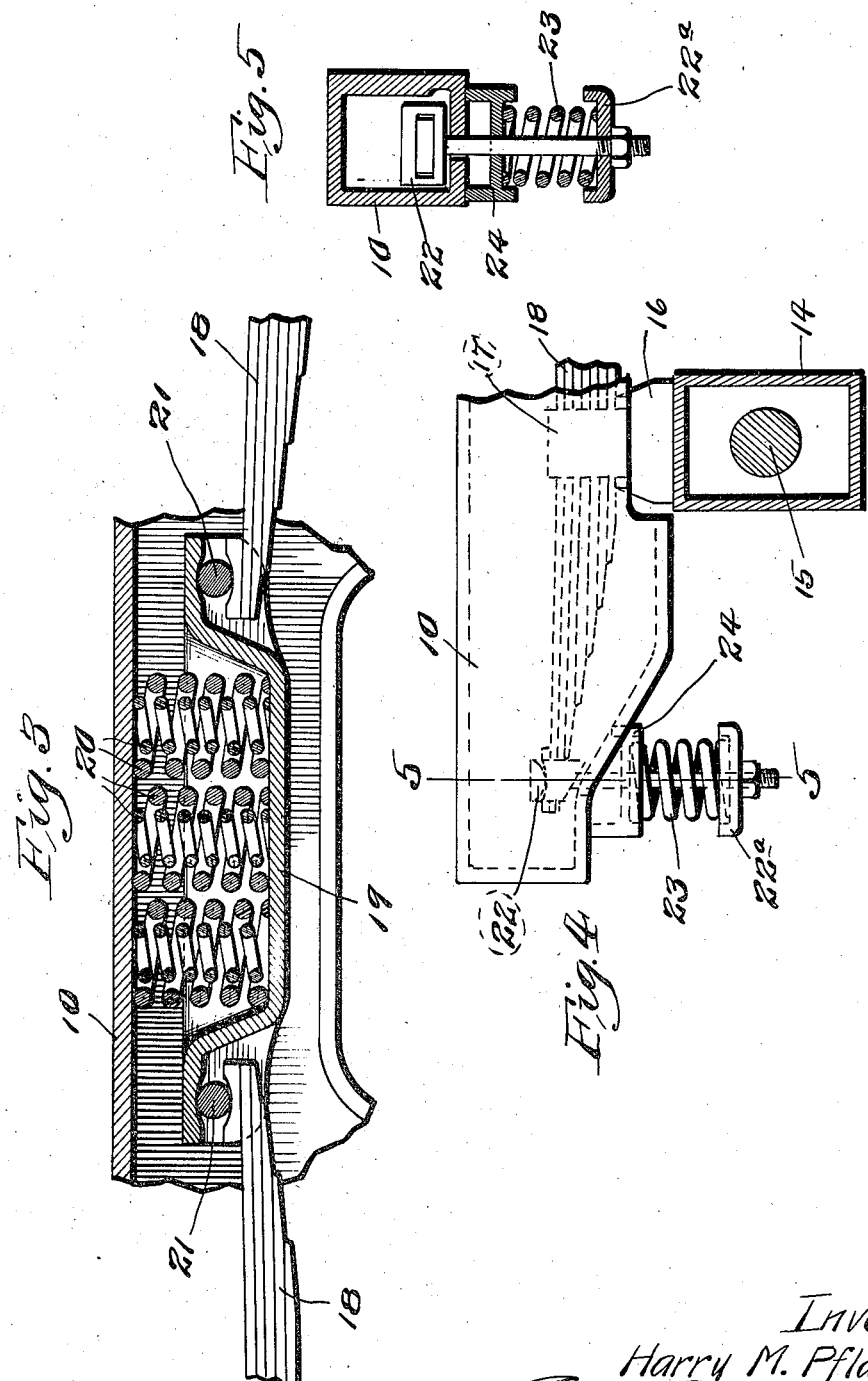

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

CAR-TRUCK.

1,277,115.  Specification of Letters Patent.  Patented Aug. 27, 1918.

Application filed July 6, 1917. Serial No. 179,039.

*To all whom it may concern:*

Be it known that I, HARRY M. PFLAGER, a citizen of the United States, residing at St. Louis, Missouri, have invented a certain new and useful Improvement in Car-Trucks, of which the following is a full, clear, and exact description, such as will enable others skilled in the art to which it appertains to make and use the same, reference being had to the accompanying drawings, forming part of this specification.

My invention relates generally to railway car truck construction and more particularly to a new and improved spring equalizer arrangement for yieldingly supporting the truck frame upon the journal boxes, which latter it will be understood contain the bearings for the wheel carrying axles, and this application should be read and considered in connection with Patents Numbers 1,080,555, 1,080,556, 1,080,557, 1,080,558, and 1,080,559, issued to the assignee of Clarence H. Howard and myself December 9, 1913.

The principal objects of my invention are, to provide increased flexibility of the truck and equalize the distribution of weight upon all of the truck wheels; to provide a comparatively simple truck frame support which, by virtue of its arrangement and construction, will be effective in distributing and absorbing shocks and vibration due to track irregularities and preventing said shocks and vibration from being transmitted to the car body, thereby making the riding movement of said body more easy and gentle; and to dispose the flexible supporting means so that it will in nowise interfere with the free inspection, repair and adjustment of the brakes and brake rigging associated with the truck and the wheels thereof.

With the foregoing and other objects in view, my invention consists in a plurality of springs, preferably of the semi-elliptic type, mounted upon the journal boxes of the truck, a plurality of substantially rigid or non-elastic equalizing members interposed between the semi-elliptic spring, and a plurality of helical springs interposed between the non-elastic equalizing members and the truck frame, said helical springs forming a yielding or resilient fulcrum for the non-elastic equalizing members.

My invention further consists in certain novel features of construction and arrangement of parts, hereinafter more fully described and claimed, and illustrated in the accompanying drawings in which—

Figure 1 is a plan view of the side portion of a truck frame, the same being equipped with the flexible support contemplated by my invention;

Fig. 2 is a side elevational view of the truck frame, parts thereof being broken away and showing my improved supporting means associated therewith;

Fig. 3 is a vertical section taken approximately on the line 3—3 of Fig. 1;

Fig. 4 is an elevational view of the end portion of a truck frame and showing a modified form of connection between one of the semi-elliptic springs and said truck frame;

Fig. 5 is a cross section taken approximately on the line 5—5 of Fig. 4.

Referring by numerals to the accompanying drawings and particularly to Figs. 1 to 3 inclusive, 10 designates the wheel piece of an accepted type of six wheel truck frame, the same being preferably of integral construction and including end pieces 11 and transom members 12.

Rigidly fixed to and depending from the wheel pieces are pedestal jaws 13 between which are positioned the usual journal boxes 14 which contain the bearings for the ends of the wheel carrying axles 15. The wheel pieces 10 of the truck frame are preferably hollow and of box-like construction in cross section with the bottom wall or plate cut away at points between the pedestal jaws for the accommodation of the journal boxes and spring supporting members mounted thereupon.

The outer wall of the wheel piece is cut away at suitable points, preferably between the pairs of pedestal jaws to permit the ready insertion or removal of the equalizer members and springs constituting my imprived construction.

Located on top of the journal boxes 14 are bearing blocks 16, the same extending upwardly into the hollow wheel piece 10 and bearing upon each of these blocks is the band or sleeve 17 which encircles the center of a leaf spring 18, the same being preferably of the semi-elliptic type.

Loosely mounted on top of the outer ends of the pair of springs which are carried by the end pair of journal boxes are anti-friction rollers 18ª, the same bearing against the undersides of brackets 18ᵇ, the latter being arranged within the end portions of the wheel piece 10 and thus the truck frame is provided with rolling supports upon the outer ends of the outer pair of semi-elliptic springs.

Located between the springs 18 are substantially rigid or non-elastic equalizing members 19, the central portions of which are U-shape in cross section in order to form pockets for the lower ends of helical springs 20 of the compression type, that is, their normal tendency is to expand and rest compression. The upper ends of these helical springs bear directly against the underside of the top plate of the wheel piece 10 and consequently each set of springs forms a yielding or resilient fulcrum for the corresponding equalizing member. The end portions of each equalizing member are of inverted U-shape in cross section and said ends are positioned directly over the ends of the adjacent springs 18 and interposed between the ends of said springs and said inverted U-shaped ends are anti-friction rollers 21.

In the modified construction illustrated in Figs. 4 and 5, the outer ends of the pair of springs 18 which are mounted on the end pair of journal boxes are connected to the upper ends of hangers 22 preferably in the form of rods which depend downward through suitable slots in the bottom plate of the wheel piece, and carried by the lower end of each rod is a plate 22ª, the same serving as a support for a helical compression spring 23. The upper end of this spring bears directly against a bracket or lug 24, the same being positioned against the underside of the wheel piece.

In my improved construction it will be noted that the springs 18 are mounted to rock freely upon bearing blocks 16 carried by the journal boxes of the truck and that the substantially rigid equalizing members which are disposed between the springs 18 have yielding and resilient fulcrums upon the wheel pieces of the truck frame. By virtue of this arrangement, a truck frame supporting structure is provided which is yielding and resilient to a comparatively high degree and as a result, service shocks and vibration due to the passage of the truck wheels over rough track, switches, crossings and the like are practically absorbed and eliminated and the riding movement of the supported car body is rendered more easy and gentle.

The improved spring and equalizer arrangement is effective in materially increasing the flexibility of the truck and equalizing the distribution of the carried weight upon all of the truck wheels. Furthermore, by arranging the springs and equalizing members within the substantially hollow wheel pieces of the truck frame they are practically inclosed and consequently protected from injury, and further, such arrangement leaves the brake beams, brake shoes and brake rigging free for inspection and readily accessible in the event of repairs and adjustments.

While I have illustrated and described my invention as being particularly applicable for six wheel trucks, it will be understood that practically the same arrangement can be advantageously utilized in connection with trucks having other wheel arrangements.

It will be readily understood that minor changes in the size, form and construction of the various parts of my improved car truck can be made and substituted for those herein shown and described, without departing from the spirit of my invention, the scope of which is set forth in the appended claims.

I claim:

1. A flexible support for railway car trucks comprising resilient members balanced upon the journal boxes associated with the truck frame, rigid equalizing members arranged between and supported by said resilient members, which rigid equalizing members are channel-shape, and a plurality of springs arranged between each equalizing member and the truck frame.

2. The combination with a car truck frame and its journal boxes, of springs supported by the journal boxes, rigid equalizing members disposed between said springs, the central portion of the body of each rigid equalizing member being substantially U-shape in cross section and the end portions of said member being of inverted U-shape in cross section to form housings for the ends of the springs, and a plurality of coil springs interposed between each rigid equalizing member and the truck frame.

3. The combination with a car truck frame and its journal boxes, of springs supported by the journal boxes, equalizing members disposed between said springs, the ends of which equalizing members are of inverted U-shape in cross section so as to form housings for the end portions of said springs, and a plurality of springs interposed between said each equalizing member and the truck frame, all of which parts are located within the substantially hollow wheel piece of the truck frame.

4. The combination with a railway car truck frame and its journal boxes, of springs supported by the journal boxes, equalizer members arranged betweeen and supported by said springs, said equalizer members having yielding and resilient fulcrums upon the truck frame and the ends of said equalizing members being of inverted U-shape in cross section to form housings for the ends of the springs which are supported by the journal boxes.

5. The combination with a truck frame and its journal boxes, of springs supported by said journal boxes, equalizer members disposed between and supported by said springs, the main body portion of each equalizing member being channel-shape, and a series of helical springs disposed within the channel-shaped portion of each equalizer member and bearing against the truck frame.

6. The combination with a truck frame and its journal boxes, of springs supported by said journal boxes, equalizer members disposed between and supported by said springs, the main body portion of each equalizing member being channel shape, and a series of helical springs disposed within the channel shaped portion of each equalizer member and the truck frame, all of which parts are disposed within the substantially hollow wheel piece of the truck frame.

7. A flexible support for railway car trucks comprising alternately arranged springs and rigid equalizing members, the same being disposed in series with the springs bearing upon the journal boxes, the equalizing members being disposed between said springs each of said equalizing members being provided intermediate its end with a pocket, a series of helical springs occupying said pocket and bearing upon the truck frame, and the ends of each equalizing member being provided with pockets adapted to receive the ends of the first mentioned springs.

In testimony whereof I hereunto affix my signature this 26th day of June, 1917.

HARRY M. PFLAGER.